June 12, 1951 E. CANNON 2,556,795
TRANSFER MOLDING PRESS
Filed March 24, 1948

INVENTOR.
Earl Cannon
BY
Wm. O. B. Garner Atty.

Patented June 12, 1951

2,556,795

UNITED STATES PATENT OFFICE 2,556,795

TRANSFER MOLDING PRESS

Earl Cannon, Downers Grove, Ill., assignor to American Steel Foundries, Chicago, Ill., a corporation of New Jersey Application March 24, 1948, Serial No. 16,733

9 Claims. (Cl. 18—30)

This invention relates to molding presses and more particularly to a novel hydraulic molding press of the so-called transfer type wherein the molded material is disposed within a passage and is transferred to the mold cavity after the latter has been closed by relative movement of the mold sections.

A general object of the invention is to devise a press of the above-described type wherein the material is transferred to the mold cavity without reducing the hydraulic pressure holding the mold sections in closed position.

Another object of the invention is to provide a transfer molding press with a convenient height for insertion of the material to be molded.

Still another object is to devise a press, such as above described, with both the clamping ram and the transfer ram movable upwardly and with independent pressure control.

Still another object is to devise a transfer molding press wherein all of the hydraulic mechanism is conveniently disposed below the dies.

A further object of the invention is to provide a power device operatively connected to the transfer mechanism by linkage extending through a slot or passage in the press ram which maintains the mold sections in closed position.

Another object of the invention is to facilitate assembly and disassembly of the press parts by disposing power means for the transfer mechanism at one side of the hydraulic motor which closes the mold sections.

Figure 1:
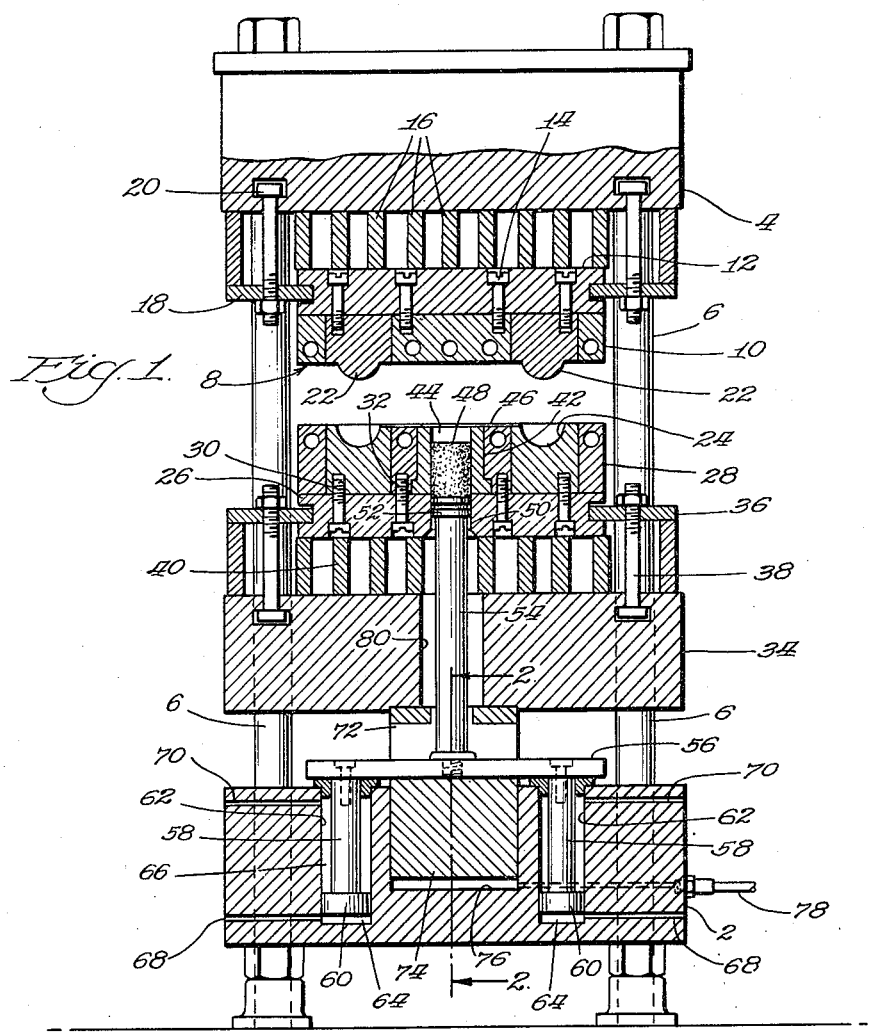
Figure 2:
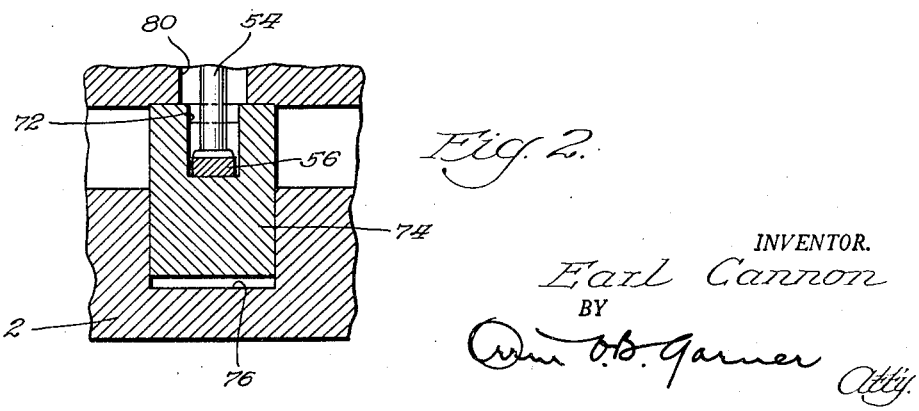

The foregoing and other objects and advantages of the invention will become apparent from a consideration of the following specification and the accompanying drawings, wherein:

Figure 1 is a central vertical sectional view of an hydraulic press embodying the invention, portions of the structure being shown in elevation for the sake of clarity; and Figure 2 is a sectional view on the line 2—2 of Figure 1.

Describing the invention in detail, the press comprises a bed 2 connected to an upper platen 4 in conventional manner by tie rods 6.

An upper mold section, generally designated 8, comprises a die holder 10 and a backing plate 12 secured thereto as by screws 14. The backing plate is clamped against spacer bars 16 by means of clamping plates 18 connected to the upper platen 4 by bolt and nut assemblies 20. The die holder 10 carries male die members 22 cooperating with female die members 24 to define a mold cavity, as hereinafter described.

The female die members 24 are mounted in a die holder 28. The die members 24 and the die holder 28 are secured to a backing plate 26 by screws 30 and 32 respectively, and define with said plate 26 a lower, movable mold section secured to a movable lower platen 34 by clamping plates 36 connected to the lower platen as by bolt and nut assemblies 38, spacer bars 40 being provided between the platen 34 and the backing plate 26.

A sleeve 42 is mounted in the lower die carrier 28 to afford a passage 44 communicating by gates 46 with the mold cavity defined by the dies 22 and 24 in the closed position of the mold sections. The passage 44 is adapted to contain a quantity of material 48 to be molded, as hereinafter discussed. The backing plate 26 comprises a passage 50 communicating with the passage 44 and defining an extension thereof for reception of a plunger 52 adapted to transfer the material 48 from the passage 44 to the mold cavity in a manner hereinafter described.

The plunger 52 is actuated by a rod member 54 mounted at its upper end on a bar 56, the ends of which are operatively connected to a pair of rams 58 having heads 60 reciprocal in cylinders 62 within the bed 2 to define advance and pull-back chambers 64 and 66 having inlet ports 68 and 70 respectively. The bar 56 extends through a slot or passage 72 in a main press ram 74 which reciprocates within a main press cylinder 76 supplied with hydraulic fluid by a supply line 78 connected to an associated source of hydraulic pressure (not shown) such as, for example, an accummulator or pump. The rod 54 extends through a passage 80 in the movable press platen 34 for actuation of the plunger 52, as hereinafter described in connection with the operation of the press.

In operation of the press, a predetermined quantity of the material 48 is inserted into the passage 44 and thereafter the mold cavity is closed by actuation of the ram 74 as pressure fluid is admitted through the line 78 to the cylinder 76 urging the ram 74 and lower platen 34 upwardly. After the mold cavity has been closed, the material 48 is transferred to the cavity by actuation of the plunger 52. This is accomplished by admission of pressure fluid through the ports 68 to the advance chambers 64 thereby advancing the rams 58 upwardly and urging the bar 56 and actuator rod member 54 upwardly whereby the plunger 52 forces the material 48 from the passage 44 through the gates 46 into the mold cavity. After a sufficient length of time to insure proper setting of the molded material, the lower platen 34 is returned to its original position shown in the drawings either by conventional pullback cylinders (not shown) or by force of gravity upon release of hydraulic pressure in the cylinder 76. This opens the mold cavity accommodating removal of the molded material. Either before or after opening of the mold cavity, the plunger 52 is retracted by exhausting the ports 68 and admitting pressure fluid to the ports 70 which communicate with the pullback chambers 66, whereby the rams 58 are urged downwardly to retract the plunger 52 by means of the intermediate linkage including the bar 56 and the rod member 54. At this time the press is in the position shown in the drawings preparatory to initiation of a new cycle. As best seen in Figure 1, the rams 58 and their cylinders 62 are entirely disposed externally of the cylinder 76 and are spaced from its axis which is on the line 2—2 of Figure 1. Furthermore, the rams 58 and cylinders 62 are entirely spaced from the piston 74 whereby pressure within the chambers 64 during actuation of the plunger 52, as heretofore described, is not effective to counteract the clamping pressure within the main cylinder 76.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A transfer molding press comprising a mold mechanism including relatively movable mold sections adapted in their closed position to define a mold cavity, a passage through one of said sections communicating with said cavity and adapted to contain the material to be molded, a plunger in said passage for forcing said material therefrom into said cavity, an actuator bar connected to said plunger, and actuating means for said bar comprising a cylinder, a ram having a pressure area at one end thereof equal to the full cross-sectional area of the cylinder and adapted to be acted on by pressure fluid therein, said ram having a slot entirely spaced lengthwise thereof from said area, said slot receiving said bar and affording a seat therefor at the bottom of said slot, whereby the bar is carried with said ram on the advance stroke thereof, and power means independent of said ram for moving the bar through said slot after said ram has reached the end of its advance stroke, said ram being operatively connected to said mechanism for closing the same on the advance stroke of said ram, said power means being entirely spaced from the axis of said cylinder and being entirely spaced from the ram.

2. An hydraulic molding press comprising a mold mechanism including a plurality of relatively movable sections adapted in closed position thereof to define a mold cavity, transfer means externally of said cavity and connected thereto for transferring associated material to be molded therein, an hydraulic motor including a cylinder member and a ram member therein having a pressure area in said cylinder member equal to the full cross-sectional area of the cylinder member and adapted to be acted on by pressure fluid therein, one of said members being connected to said mechanism for closing said sections, and operating means connected to said transfer means for actuation of the latter, said operating means being engageable with said one member for movement therewith on the closing stroke thereof, power means entirely spaced from the ram and from the axis of said cylinder, said power means being entirely independent of said motor and being adapted for actuation of said operating means after said one member has completed the closing stroke thereof, said operating means extending through a passage in said ram member spaced from said area.

3. A transfer molding press comprising a mold mechanism including relatively movable mold sections adapted in their closed position to define a mold cavity, a transfer mechanism connected to said cavity for transferring thereto material to be molded, operating means comprising a cylinder and a ram having an uninterrupted pressure area equal to the maximum cross-sectional area of the ram and adapted to be acted on by pressure fluid in said cylinder, said ram being operatively connected to said transfer mechanism and to said mold mechanism for simultaneously closing the latter and moving said transfer mechanism into operative association therewith, power means disposed on at least one side of said ram for actuating said transfer mechanism independently of the ram in the closed position of said mold mechanism, said power means being entirely spaced from the ram and being disposed externally of the cylinder and entirely spaced from its axis, and a mechanical linkage extending from said power means to said transfer mechanism, through a portion of said ram spaced from said area.

4. An hydraulic press comprising a press bed and a fixed platen in spaced relationship thereto, a cylinder in said bed, a ram in said cylinder having a pressure area equal to its maximum cross-sectional area and adapted to be acted on by fluid in said cylinder, a movable platen operatively connected to said ram for actuation thereby, a movable mold section carried by said movable platen, a fixed mold section carried by the fixed platen, passage means extending from the parting line of the movable section through the movable platen and through a portion of said ram spaced from said area, a pair of hydraulic cylinders in said bed at opposite sides of the first-mentioned cylinder, double acting hydraulic rams in respective cylinders of said pair, and means operatively connected to said double acting rams and extending through said passage means, for transferring moldable material therein to said mold cavity.

5. An hydraulic molding press comprising relatively movable mold sections adapted in their closed position to define a mold cavity, a passage through one of said sections adapted to communicate with said cavity, means movable in said passage for urging associated molded material therefrom into said cavity, an hydraulic motor comprising a cylinder member and a ram member having an uninterrupted pressure area therein adapted to be acted on by fluid in said cylinder member, the ram having an operative connection to said one section for urging the latter to closed position, a passage in the ram entirely spaced from said area, a power device at one side of said cylinder externally thereof and entirely spaced from its axis at one side thereof and from said ram, and means extending through said ram passage operatively connecting said device to said movable means for actuation of the latter, said power device and both of said means being entirely spaced from said area.

6. An hydraulic molding press comprising relatively movable mold sections adapted to define in their closed position a mold cavity, an hydraulic motor operatively associated with one of the mold sections for urging the same to its closed position, said motor including an hydraulic cylinder and a reciprocal ram having an advance pressure area equal to its full cross-sectional area and adapted to be acted on by pressure fluid in the cylinder, a passage through said one section adapted to communicate with the mold cavity, transfer means in said passage for urging moldable material therefrom into said cavity, a power device at one side of said motor said power device being disposed entirely externally of the cylinder at one side of its axis and being entirely spaced from said ram, and linkage disposed entirely externally of the cylinder and extending through a passage in said ram operatively connecting said device to said transfer means for actuation of the latter, said power device, said transfer means and said linkage being entirely spaced from said area.

7. An hydraulic molding press comprising a fixed mold section, a mold section movable into cooperative relationship with the fixed section to define a mold cavity therewith, a passage through the movable section adapted to communicate with said cavity, an hydraulic motor including a cylinder, and a ram having an advance pressure area in said cylinder adapted to be acted on by hydraulic pressure fluid therein and equal to the maximum cross-sectional area of the ram in the cylinder, said ram being operatively connected to the movable section for actuation thereof, a slot through said ram entirely spaced from said area, an actuator movable in said slot, a power device at one side of said ram connected to said actuator for operating the same, said power device being entirely spaced from the ram, and being disposed entirely externally of the cylinder at one side of its axis, and a plunger operatively connected to the actuator and movable in said passage for urging associated material therefrom into said cavity, said actuator, said power device, and said plunger being entirely spaced from said area.

8. An hydraulic molding press comprising relatively movable mold sections adapted to define a mold cavity, an hydraulic cylinder, a ram having a pressure area therein adapted to be acted on by hydraulic fluid in said cylinder, said ram being operatively connected to one of the sections, a slot through the ram extending axially thereof and entirely spaced from said area, and an elongated member extending through said slot, a pair of power devices disposed at opposite sides of the cylinder and operatively connected to the elongated member, and a transfer device for transferring moldable material to said cavity having an operative connection to said elongated member for actuation thereby upon actuation of said device, said power device, said transfer device, said elongated member and said operative connection being entirely spaced from said area.

9. An hydraulic molding press comprising a plurality of relatively movable mold sections adapted in the closed position thereof to define a mold cavity, a passage through one of said sections communicating with said cavity, transfer means for urging moldable material from said passage into said cavity, and a plurality of hydraulic motors arranged in parallel, one of said motors having an operative connection to the transfer means and being entirely spaced from the other of said motors externally thereof and at one side of its axis, and said other of said motors having a cylinder member, a ram member therein, opposed pressure areas on said members, the pressure area of the ram member being equal to the maximum cross-sectional area thereof within the cylinder member, one of said members being operatively connected to said one mold section for urging the same to closed position, said connection extending through a portion of said one member, said connection, said one motor and said transfer means being entirely spaced from said areas.

EARL CANNON.

REFERENCES CITED

The following references are of record in the file of this patent:

UNITED STATES PATENTS

| Number | Name | Date |
|---|---|---|
| 1,961,941 | Pack | June 5, 1934 |
| 2,043,584 | Husted | June 9, 1936 |
| 2,351,774 | McGowen | June 20, 1944 |
| 2,420,405 | Alves | May 13, 1947 |